(12) United States Patent
Tierney et al.

(10) Patent No.: US 12,440,223 B2
(45) Date of Patent: Oct. 14, 2025

(54) HAND CRANK MANUALLY DRIVEN INTRAOSSEOUS INJECTION DEVICES AND METHODS

(71) Applicant: Teleflex Life Sciences II LLC, Wilmington, DE (US)

(72) Inventors: Morgan Tierney, Ferbane (IE); Aleksejus Fominas, Athlone (IE); Eugene Skelton, Cabinteely (IE); Anthony Wright, Dungarvan (IE)

(73) Assignee: TELEFLEX LIFE SCIENCES II LLC, Wilmington, DE (US)

( * ) Notice: Subject to any disclaimer, the term of this patent is extended or adjusted under 35 U.S.C. 154(b) by 0 days.

(21) Appl. No.: 17/366,590

(22) Filed: Jul. 2, 2021

(65) Prior Publication Data
US 2021/0330337 A1 Oct. 28, 2021

Related U.S. Application Data

(63) Continuation of application No. PCT/IB2019/061292, filed on Dec. 23, 2019.
(Continued)

(51) Int. Cl.
*A61B 17/16* (2006.01)
(52) U.S. Cl.
CPC .............................. *A61B 17/1624* (2013.01)
(58) Field of Classification Search
CPC . B23B 45/06; A61B 17/1624; A61B 17/1635; A61B 17/164; A61B 17/1695;
(Continued)

(56) References Cited

U.S. PATENT DOCUMENTS

| 1,575,953 | A | * | 3/1926 | Toorks | B23Q 5/045 81/34 |
| 2,144,342 | A | * | 1/1939 | Morrison | A61B 17/1624 408/129 |

(Continued)

FOREIGN PATENT DOCUMENTS

| CN | 1913833 A | 2/2007 |
| GB | 2306355 A | 7/1997 |

(Continued)

*Primary Examiner* — Matthew J Lawson
(74) *Attorney, Agent, or Firm* — BakerHostetler

(57) ABSTRACT

Manually driven intraosseous devices and associated methods are described. The intraosseous device includes a housing and a transmission at least partially disposed within the housing. The transmission includes a first portion and a second portion. The second portion includes a manual actuator that is at least partially disposed outside of the housing. The intraosseous device also includes a penetrator assembly releasably connected to the first portion of the transmission. The transmission is configured to transmit a force, which is applied manually to the manual actuator, to the penetrator assembly to rotate the penetrator assembly relative to the housing and to drive the penetrator assembly through a bone into an intraosseous space. The manual actuator is a hand crank that is configured to be manually cranked by an operator to transfer rotational force to the first portion of the transmission.

20 Claims, 9 Drawing Sheets

Related U.S. Application Data

(60) Provisional application No. 62/788,226, filed on Jan. 4, 2019.

(58) Field of Classification Search
CPC ............ A61B 17/3472; A61B 17/3476; A61B 17/3478; A61B 10/025; A61B 2010/0258
See application file for complete search history.

(56) References Cited

U.S. PATENT DOCUMENTS

| | | | |
|---|---|---|---|
| 2,546,655 A * | 3/1951 | Shaler | B23B 45/06 408/124 |
| 8,974,410 B2 | 3/2015 | Miller et al. | |
| 8,998,848 B2 | 4/2015 | Miller et al. | |
| 9,839,740 B2 | 12/2017 | Beamer et al. | |
| 2005/0165403 A1 * | 7/2005 | Miller | A61B 10/025 600/567 |
| 2005/0165404 A1 * | 7/2005 | Miller | A61B 10/025 606/80 |
| 2007/0270775 A1 * | 11/2007 | Miller | A61B 10/025 604/117 |
| 2009/0093830 A1 | 4/2009 | Miller | |
| 2009/0131827 A1 * | 5/2009 | Crocker | A61B 10/025 604/22 |
| 2009/0194446 A1 * | 8/2009 | Miller | A61B 17/3472 606/86 R |
| 2010/0298784 A1 * | 11/2010 | Miller | A61B 17/3472 604/317 |
| 2013/0325012 A1 * | 12/2013 | Piferi | B23B 45/06 606/80 |
| 2014/0276206 A1 * | 9/2014 | Woodward | B23Q 3/12 600/564 |
| 2014/0343454 A1 | 11/2014 | Miller et al. | |
| 2015/0230823 A1 * | 8/2015 | Morgan | A61B 17/3476 604/272 |
| 2018/0116693 A1 | 5/2018 | Blanchard et al. | |
| 2021/0282812 A1 * | 9/2021 | Tierney | A61B 17/1624 |
| 2024/0245409 A1 * | 7/2024 | Asfora | A61B 17/1633 |

FOREIGN PATENT DOCUMENTS

| | | |
|---|---|---|
| WO | 2005/072625 A2 | 8/2005 |
| WO | 2020/110042 A1 | 6/2020 |

* cited by examiner

FIG. 8A   FIG. 8B

HAND CRANK MANUALLY DRIVEN INTRAOSSEOUS INJECTION DEVICES AND METHODS

CROSS-REFERENCE TO RELATED APPLICATIONS

This application is a Continuation of International Patent Application PCT/IB2019/061292, filed Dec. 23, 2019, which claims the benefit of U.S. Provisional Patent Application No. 62/788,226, filed Jan. 4, 2019. The disclosures of which are hereby incorporated by reference in their entirety

TECHNICAL FIELD

This application relates generally to systems, devices, and methods for intraocular injection.

BACKGROUND

Every year, patients around the world are treated for life-threatening emergencies. Such life-threatening emergencies include, for example, shock, trauma, cardiac arrest, drug overdoses, diabetic ketoacidosis, arrhythmias, burns, and status epilepticus. According to one study, more than 1.5 million patients suffer from heart attacks (myocardial infarctions) each year, with over 500 thousand of those patients dying from complications arising from the heart attacks. Military, remote, and/or rural environments may present unique challenges for treatment of life-threatening injuries. Many patients die unnecessarily because intravenous (IV) access cannot be achieved in a timely manner.

An essential element for treating many of the above-described life-threatening emergencies is rapid establishment of an IV line to administer drugs and fluids directly into a patient's vascular system. Whether in an ambulance by paramedics, in an emergency room by emergency specialists, in a remote or rural area by a first-responder, or on a battlefield by a medic, the goal is the same—quickly start an IV to administer lifesaving drugs and fluids. To a large degree, the ability to successfully treat most critical emergencies is dependent on the skill and/or luck of an operator to rapidly access the vascular system. While it is relatively easy to start an IV on some patients, medical professionals often experience significant difficulty establishing IV access for a number of patients, for whom the success rate of IV establishment is particularly low. In addition to the risk to life and limb, failed attempts to establish an IV can lead to unnecessary pain to patients being probed.

In the case of patients with chronic disease or the elderly, availability of easily accessible veins may be depleted. Other patients may have no available IV sites due to anatomical scarcity of peripheral veins, obesity, extreme dehydration or previous IV drug use. For such patients, finding a suitable site for administering lifesaving therapy often becomes a monumental and frustrating task. While morbidity and mortality statistics are not generally available, it is generally known that many patients with life threatening emergencies have died because access to the vascular system with lifesaving IV therapy was delayed or simply not possible.

The intraosseous (IO) space provides a direct conduit to the vascular system and provides an attractive alternate route for the administration of IV drugs and fluids. Drugs and/or fluid administered into an IO space enter the blood circulation system at least as rapidly as when administered intravenously. Accordingly, bone marrow may be an analog of a large, non-collapsible vein. IO infusion has long been the standard of care in pediatric emergencies when rapid IV access is not possible.

SUMMARY

The present inventors recognize that there is a need to improve one or more features of IO injection devices and methods. For example, there exists a need for IO injection devices that are manually driven and have a low cost of production for use as an alternative to IV access in emergent, urgent, or medically necessary cases.

An aspect of the various embodiments of the invention is directed to an intraosseous device. The intraosseous device includes a housing and a transmission at least partially disposed within the housing. The transmission includes a first portion and a second portion. The second portion may include a manual actuator that is at least partially disposed outside of the housing. The intraosseous device further includes a penetrator assembly releasably connected to the first portion of the transmission. The transmission is configured to transmit a force, which is applied manually to the manual actuator, to the penetrator assembly to rotate the penetrator assembly relative to the housing and to drive the penetrator assembly through a bone into an intraosseous space.

Another aspect of the present invention includes a method of accessing an intraosseous space of a patient. The method includes providing an intraosseous device comprising a housing and a transmission at least partially disposed within the housing. The transmission includes a first portion and a second portion. The provided intraosseous device further includes a penetrator assembly releasably connected to the first portion of the transmission. The method also includes driving the penetrator assembly through a bone into the intraosseous space of the patient. Driving the penetrator assembly through the bone into the intraosseous space of the patient includes manually applying a first force to the housing, where the first force directs the intraosseous device towards an insertion site on the patient. Driving the penetrator assembly through the bone into the intraosseous space of the patient further includes manually applying a second force, concurrently with manually applying the first force, to the second portion of the transmission and transmitting the second force to the penetrator assembly to rotate the penetrator assembly relative to the housing.

There are, of course, additional aspects of the various embodiments of the invention disclosed herein that will be described below and which will form the subject matter of the claims. In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the Abstract, are for the purpose of description and should not be regarded as limiting.

As such, those skilled in the art will appreciate that the conception upon which this invention is based may readily be utilized as a basis for the designing of other structures, methods, and systems for carrying out the several purposes of the invention. It is important, therefore, that the claims be regarded as including such equivalent constructions insofar as they do not depart from the spirit and scope of the invention.

BRIEF DESCRIPTION OF DRAWINGS

In order that the invention may be readily understood, aspects of the invention are illustrated by way of examples in the accompanying drawings; however, the subject matter is not limited to the disclosed aspects.

FIGS. 8A-8C illustrate views of an exemplary penetrator assembly of intraosseous devices in accordance with aspects of the invention.

Features of the intraosseous devices and associated methods according to aspects of the invention are described with reference to the drawings, in which like reference numerals refer to like parts throughout.

DETAILED DESCRIPTION OF ILLUSTRATIVE EMBODIMENTS OF THE INVENTION

Figure 1A:
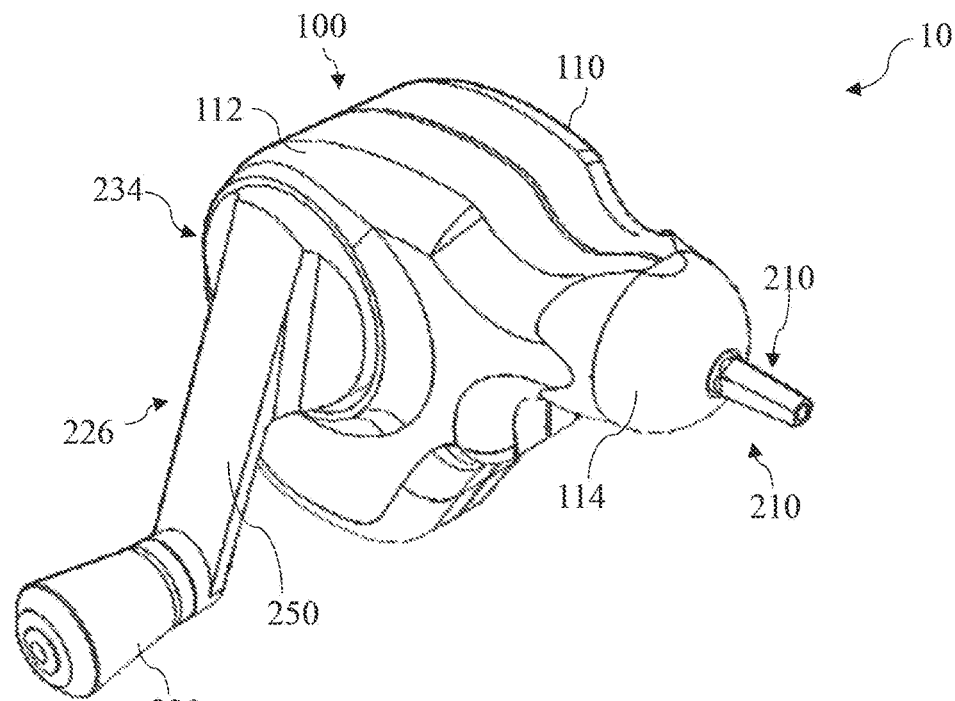
FIGS. 1A and 1B respectively illustrate a prospective and an exploded view of an exemplary embodiment of the intraosseous device in accordance with aspects of the invention.
Figure 1B:
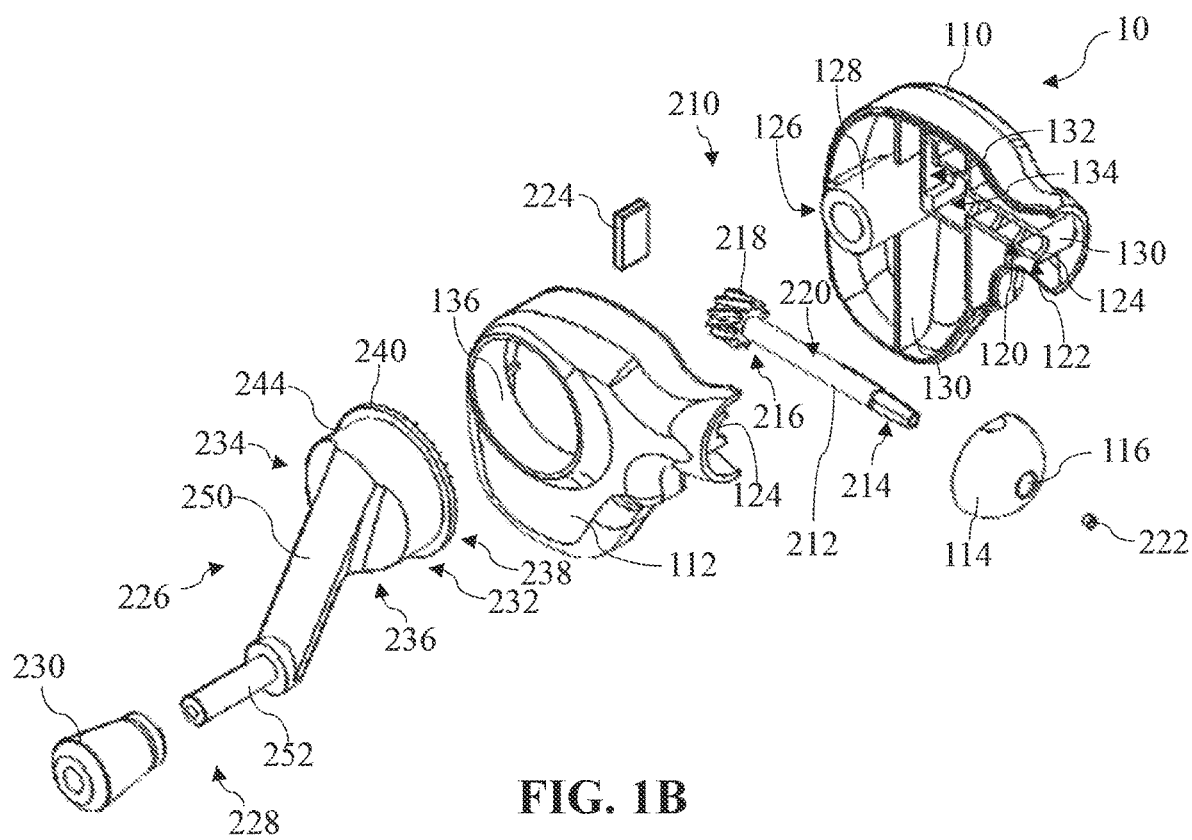
Figure 2A:
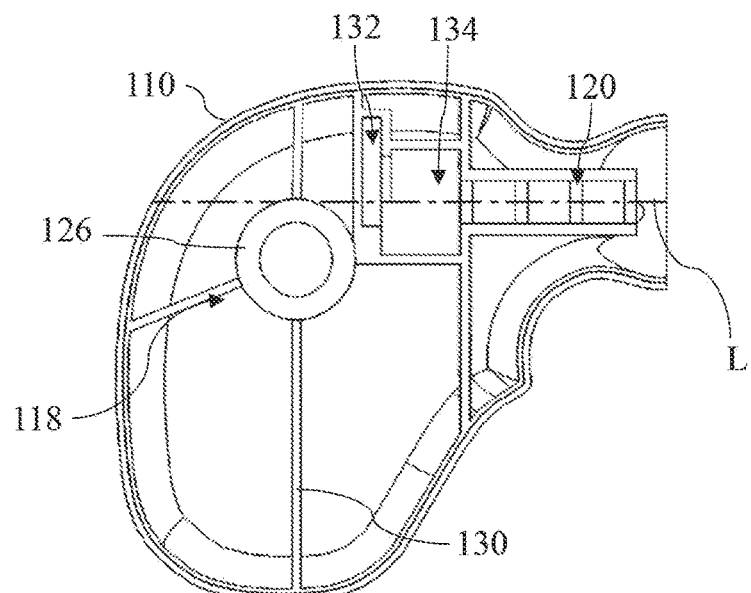
FIGS. 2A-2C respectively illustrate side views of first and second bodies of the housing and of the hand crank in accordance with aspects of the invention.
Figure 2B:
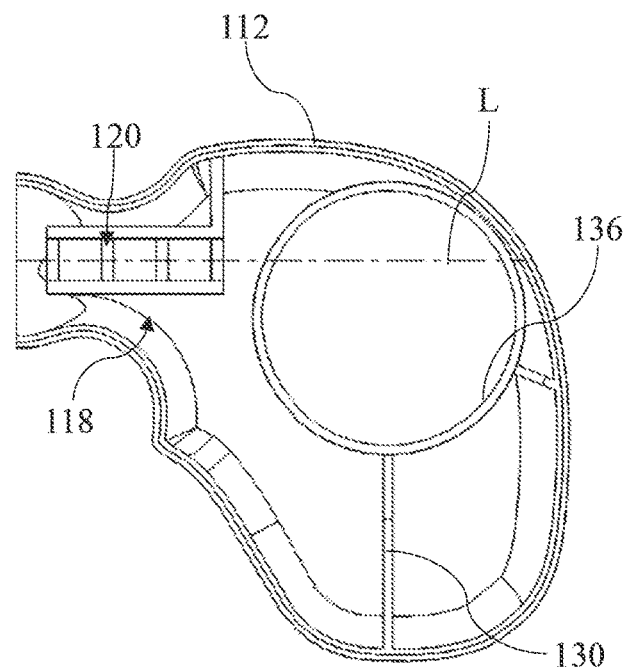
Figure 2C:
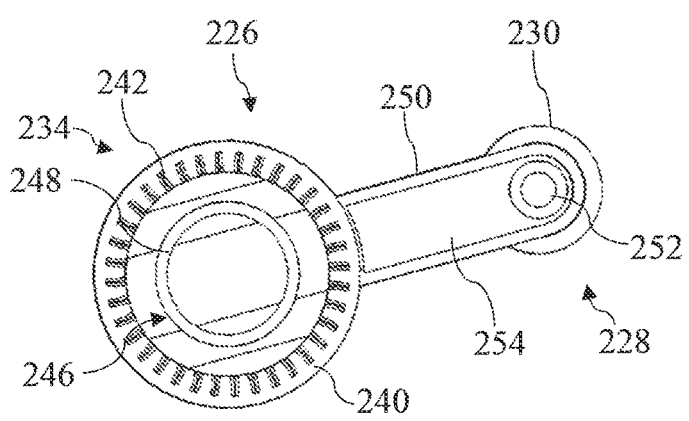

Vascular system access may be essential for treatment of many serious diseases, chronic conditions and acute emergency situations. Yet, many patients experience extreme difficulty obtaining effective treatment because of inability to obtain or maintain intravenous (IV) access. An intraosseous (IO) space provides a direct conduit to a patient's vascular system and systemic circulation. Therefore, IO access is an effective route to administer a wide variety of drugs, other medications and fluids. Rapid IO access offers great promise for almost any serious emergency that requires vascular access to administer lifesaving drugs, other medications and/or fluids when traditional IV access is difficult or impossible.

An intraosseous space may generally be described as region where cancellous bone and associated medullary cavity combine. Bone marrow typically includes blood, blood forming cells, and connective tissue found in an intraosseous space surrounded by compact bone.

IO access may be used as a "bridge" (temporary fluid and drug therapy) during emergency conditions until conventional IV sites can be found and used. Conventional IV sites often become available because fluids and/or medication provided via IO access may stabilize a patient and expand veins and other portions of a patient's vascular system. IO devices and associated procedures incorporating teachings of the present disclosure may become standard care for administering medications and fluids in situations when IV access is difficult or not possible.

Intraosseous access may be used as a "routine" procedure with chronic conditions that substantially reduce or eliminate availability of conventional IV sites. Examples of such chronic conditions may include, but are not limited to, dialysis patients, patients in intensive care units and epilepsy patients. Intraosseous devices and associated apparatus incorporating teachings of the present disclosure may be quickly and safely used to provide IO access to a patient's vascular system in difficult cases such as status epilepticus to give medical personnel an opportunity to administer crucial medications and/or fluids.

The term "driver" may be used in this application to include any type of manual driver satisfactory for inserting a penetrator assembly or an IO needle into selected portions of a patient's vascular system. Various techniques may be satisfactorily used to releasably engage or a penetrator assembly with manual drivers.

For some applications a manual driver may be securely attached to a portion of an IO device or may be formed as an integral component of an IO device. Various types of connectors may also be used to releasably couple a manual driver with a penetrator assembly. A wide variety of connectors and associated connector receptacles, fittings and/or other types of connections with various dimensions and configurations may be satisfactorily used to engage a penetrator assembly with a manual driver.

For some applications a layer or coating (not expressly shown) of an anticoagulant such as, but not limited to, heparin may be placed on interior and/or exterior portions of a catheter or cannula to prevent thrombotic occlusion of the catheter or cannula. Anticoagulants may reduce platelet adhesion to interior surfaces of the catheter or cannula and may reduce clotting time of blood flowing into and through the catheter or cannula. Placing a layer of an anticoagulant on the exterior of a catheter or cannula adjacent to an associated tip may be helpful to prevent clotting.

The term "fluid" may be used in this application to describe any liquid including, but not limited to, blood, water, saline solutions, IV solutions, plasma or any mixture of liquids, particulate matter, dissolved medication and/or drugs appropriate for injection into bone marrow or other insertion sites. The term "fluid" may also be used within this patent application to include body fluids such as, but not limited to, blood and cells which may be withdrawn from an insertion site.

Figure 3A:
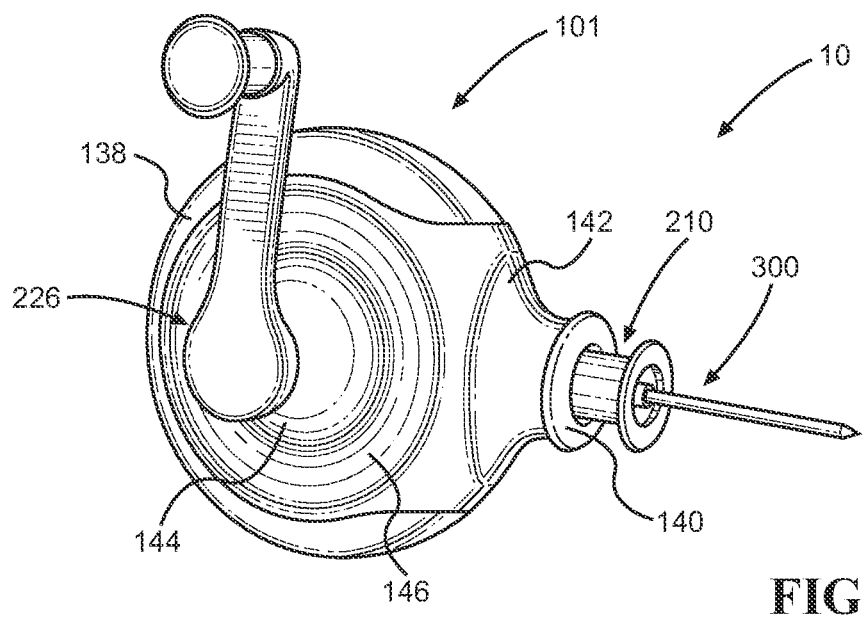
FIGS. 3A-3C illustrate embodiments of the intraosseous device including a plurality of exemplary housings in accordance with aspects of the invention.
Figure 3B:
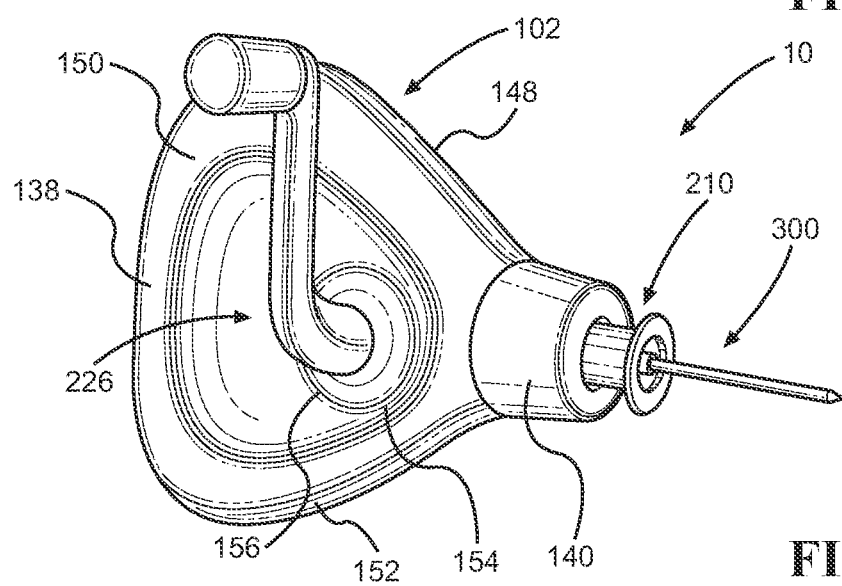
Figure 3C:
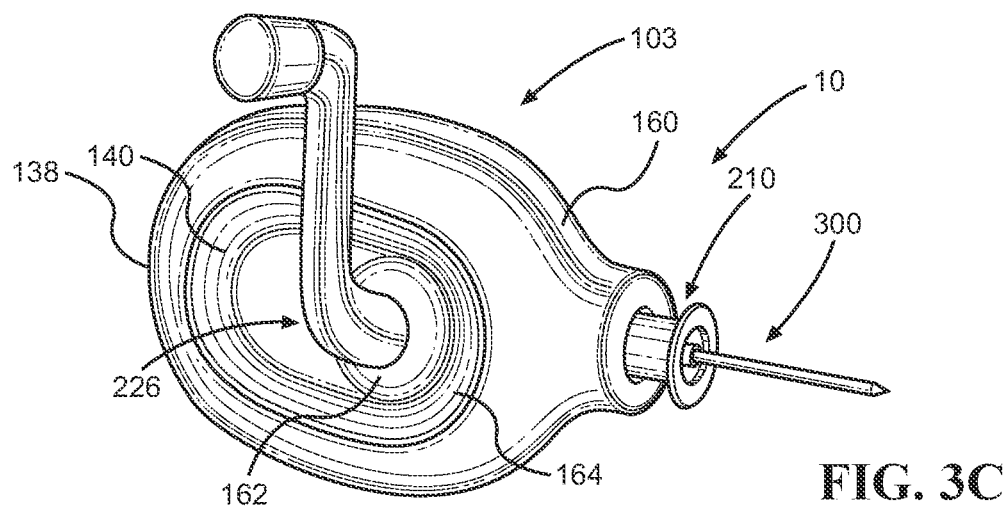

FIGS. 1A-3C show an exemplary intraosseous (IO) device 10 in accordance with aspects of the invention. FIGS. 1A and 1B respectively illustrate a prospective and an exploded view of the intraosseous device 10. FIGS. 2A-2C respectively illustrate side views of first and second bodies of the housing and of the hand crank, as described below. FIGS. 3A-3C illustrate a plurality of exemplary housings, as discussed in greater detail below.

The IO device 10 may include a driver comprising a housing 100 and a transmission at least partially disposed within the housing 100. The transmission may include a first portion 210 and a second portion 226. The second portion 226 may include a manual actuator (e.g., a hand crank) that is at least partially disposed outside of the housing 100. The IO device 10 may further include a penetrator assembly 300 that may be releasably connected to the first portion 210 of the transmission. The transmission may transmit a force, which is applied manually to the manual actuator, to the penetrator assembly 300 to rotate the penetrator assembly 300 relative to the housing 100 and to drive the penetrator assembly 300 through bone (e.g., the proximal humerus, proximal tibia, distal tibia, etc.) into an intraosseous space (not shown). That is, the transmission may rotate the penetrator assembly 300 relative to the housing 100 to facilitate driving the penetrator assembly 300 through bone into the intraosseous space while an operator presses the IO device 10 through an insertion site.

According to aspects of the invention, the manually driven transmission may obviate the need for a powered transmission, which may lower production costs of the IO device 10 and thereby improve patient access to life-saving IO devices 10. In addition, the housing 100 of the IO device 10 may be shaped to improve an operator's view of an insertion site on a patient. Further, the IO device 10 may be rotated about a longitudinal direction of the penetrator assembly 300 in accordance with operator preference such that an operator may manually apply the force to the second portion 226 of the transmission using either the operator's left or right hand. In addition, the torque and/or speed of the rotation of the penetrator assembly 300 may be controlled by the operator based upon, e.g., tactile/haptic feedback felt by the operator during application of the force to the second portion 226 of the transmission. Still further, the manually driven IO device 10 may be quieter than powered devices.

The housing 100 may be divided into one or more bodies. For example, the housing 100 may include a first body 110, a second body 112, and/or a third body 114. The first body 110, second body 112, and/or third body 114 may be releasably connected. For example, the first body 110, second body 112, and/or third body 114 may be snap fit together. The first body 110, second body 112, and/or third body 114 may additionally or alternatively be connected via fasteners (not shown) such as threads, nuts/bolts, screws, etc. The first body 110, second body 112, and/or third body 114 may alternatively be fixedly connected. For example, the first body 110, second body 112, and/or third body 114 may be fixed together via an adhesive, weld, etc. The third body 114 may include an opening 116. The opening 116 may have an inner diameter that is greater than an outer diameter of the first portion 210 of the transmission (e.g., an outer diameter of the shaft 212, described below). The first portion 210 of the transmission may extend through and beyond the opening 116 of the third body 114 for connection with the penetrator assembly 300. The housing 100 may include supports 130 that provide structural support to the housing 100. The supports 130 may be disposed within an interior of the housing 100.

The housing 100 may include may include bearings 118 that may support the first portion 210 and/or the second portion 226 of the transmission such that the first portion 210 and/or the second portion 226 of the transmission may rotate relative to the housing 100. The bearings 118 may be integrally formed with (i.e., integral with) the housing 100 and may be formed of the same material that comprises the housing 100. The bearings may alternatively be distinct components. Distinct bearings may be formed of at least some of the same materials as the housing 100 or may alternatively be formed of at least one different material from the housing 100.

The bearings 118 may include tubular bearings 120 arranged coaxially along a linear direction L that extends through the housing 100. The opening 116 of the third body 114 of the housing 100 may also be arranged coaxially with the tubular bearings 120 along the linear direction L extending through the housing 100. The tubular bearings 120 may include an inner circumferential surface 122. The inner circumferential surface 122 of the tubular bearings 120 may support the first portion 210 of the transmission such that the first portion 210 of the transmission may rotate relative to the housing 100. In embodiments not shown, a single tubular bearing may support the first portion 210 of the transmission. An inner diameter of the inner circumferential surface 122 of the tubular bearings 120 may be larger than the outer diameter of the first portion 210 of the transmission. The first portion 210 of the transmission may extend through the tubular bearings 120. The inner diameter of the inner circumferential surface 122 of the tubular bearings 120 may be large enough to allow the first portion 210 of the transmission to extend through the tubular bearings 120 and to rotate within the tubular bearings 120, yet small enough to restrict wobbling of the first portion 210 of the transmission.

The tubular bearings 120 may each comprise semi-circular bearings surfaces 124 respectively provided on the first body 110 and the second body 112. The semi-circular bearing surfaces 124 may be respectively arranged on the first body 110 and the second body 112 such that when the first body 110 and the second body 112 are releasably connected the semi-circular bearing surfaces 124 are united together to form the inner circumferential surface 122 of the tubular bearings 120. The semi-circular bearing surfaces 124 may be respectively provided on the supports 130 of the first body 110 and the second body 112.

The bearings 118 may further include a cylindrical bearing 126 extending perpendicular to the linear direction L of the housing 100. The cylindrical bearing 126 may support the second portion 226 of the transmission such that the second portion 226 of the transmission may rotate relative to the housing 100. For example, the cylindrical bearing 126 may have an outer circumferential surface 128. The cylindrical bearing 126 may be provided within a space bounded by an inner circumferential surface 248 of the second portion 226 of the transmission such that the outer circumferential surface 128 of the cylindrical bearing 126 rotatably supports the second portion 226 of the transmission. A diameter of the outer circumferential surface 128 of the cylindrical bearing 126 may be smaller than a diameter of the inner circumferential surface 248 of the second portion 226 of the transmission. The diameter of the outer circumferential surface 128 of the cylindrical bearing 126 may be small enough to allow the inner circumferential surface 248 of the second portion 226 of the transmission to fit around the outer circumferential surface 128 of the transmission, yet large enough to restrict wobbling of the second portion 226 of the transmission. In alternate embodiments not shown, the second portion 226 of the transmission may include a circumferential surface that may be provided within a space bounded by an inner circumferential surface of the cylindrical bearing 126 such that the inner circumferential surface of the cylindrical bearing 126 rotatably supports the second portion 226 of the transmission. The cylindrical bearing 126 may be provided on the first body 110 or the second body 112 of the housing 100. For example, the cylindrical bearing 126 may be provided on the first body 110.

The housing 100 may further include a first chamber 132, a second chamber 134, and/or an opening 136 that may accommodate and/or support the transmission. The first chamber 132 and/or the second chamber 134 may accommodate and/or support at least part of the first portion 210 of the transmission, as described below. The first chamber 132 and/or the second chamber 134 may be provided on the first body 110 or the second body 112 of the housing 100. In an embodiment of the invention, the first chamber 132, the second chamber 134, and the cylindrical bearing 126 may each be provided on the same body (e.g., the first body 110) of the housing 100. The opening 136 may be provided on either the first body 110 or the second body 112 of the housing 100, and the second portion 226 of the transmission may extend through the opening 136. The opening 136 may be provided on a different body (e.g., the second body 112) of the housing 100 from the body of the housing 100 that includes the first chamber 132, the second chamber 134, and/or the cylindrical bearing 126.

The housing 100 may be formed of any suitable material, or combination of materials, such as, e.g., plastics, metals, composites, rubber, etc. The housing 100 may include ergonomic portions 138 that may improve usability of the IO device 10 by, e.g., improving an operator's grip on the IO device 10. The ergonomic portions 138 may be textured. The ergonomic portions 138 may additionally or alternatively be formed of a material different from materials forming other portions 140 of the housing 100. For example, the housing 100 may include other portions 140 (e.g., structural regions) that are distinct from the ergonomic portions 138. The other portions 140 may be made of a first material and the ergonomic portions 138 may be made of a second material. The first material may be different from the second material. For example, the first material may be a rubber material and the second material may be plastic, metal, and/or composite material.

The housing 100 of the IO device 10 may be uniquely shaped to suit operator preferences and/or for particular applications. For example, according to an exemplary embodiment of the invention depicted in FIG. 3A, the IO device 10 may include a circularly shaped housing 101. More particularly, the circularly shaped housing 101 may be a disc. The circularly shaped housing 101 may include an outer circumferential surface 142, a central region 144, and a side face 146. The first portion 210 of the transmission may project from the outer circumferential surface 142 of the circularly shaped housing 101. The second portion 226 of the transmission may project from the side face 146 at the central region 144. The ergonomic portions 138 may be arranged at the outer circumferential surface 142.

As shown in FIG. 3B, the IO device 10 may include a triangularly shaped housing 102. The triangularly shaped housing 102 may include a first side 148, a second side 150, and a third side 152. The first portion 210 of the transmission may project from the triangularly shaped housing 102 between the first side 148 and the third side 152. The triangularly shaped housing 102 may also include a side face 154 and a central region 156. The second portion 226 of the transmission may project from the side face 154 at the central region 156. The ergonomic portions 138 may be arranged around the first side 148, the second side 150, and/or the third side 152.

As shown in FIG. 3C, the IO device 10 may include an oval shaped housing 103. The oval shaped housing 103 may include an oval shaped outer peripheral surface 160, a central region 162, and a side face 164. The first portion 210 of the transmission and may project from the oval shaped outer peripheral surface 160 of the oval shaped housing 103. The second portion 226 of the transmission may project from the side face 164 at the central region 162. The ergonomic portions 138 may be arranged at the oval shaped outer peripheral surface 160.

FIGS. 1A-2C show details of embodiments of the transmission of the IO device 10 having the housing 100. The transmission of the IO device 10 may be utilized with any of the above-described housing embodiments.

The transmission may be any system comprising, e.g., shafts, gears, torque converters, etc. that may transmit the manually applied force to the penetrator assembly 300 to rotate the penetrator assembly 300 relative to the housing 100 and to drive the penetrator assembly 300 through the bone and into the intraosseous space. For example, the first portion 210 of the transmission may include a shaft 212 arranged coaxially with the linear direction L extending through the housing 100. The shaft 212 may include a first end 214, a second end 216, and a body 220 extending between the first end 214 and the second end 216. The first end 214 of the shaft 212 may interface with the penetrator assembly 300 to connect the transmission to the penetrator assembly 300 to transmit the manual force to the penetrator assembly 300. The first end 214 of the shaft 212 may be keyed to connect to the penetrator assembly 300 in a manner that allows the shaft 212 to transmit rotational force to the penetrator assembly 300. For example, the first end 214 of the shaft 212 may be five-sided. In addition, the shaft 212 may be magnetic to facilitate connection with the penetrator assembly 300. For example, a magnet 222 may be embedded into the first end 214 of the shaft 212. Additionally or alternatively, the shaft 212 may be formed of a magnetic material such as metal.

The body 220 of the shaft 212 may be arranged through the tubular bearings 120 of the housing 100 coaxially with the linear direction L extending through the housing 100. Accordingly, shaft 212 may be rotatable relative to the housing 100.

The second end 216 of the shaft 212 may interface with the second portion 226 of the transmission (e.g., with the gear 242, described below) such that the manually applied force may be transmitted from the second portion 226 of the transmission to rotate the shaft 212 about the linear direction L extending through the housing 100. For example, the second end 216 of the shaft 212 may include a gear 218, such as a helical gear. The gear 218 may be accommodated within the second chamber 134 of the housing 100 such that the gear 218 may freely rotate relative to the housing 100. The gear 218 may mesh with the second portion 226 of the transmission such that rotational force of the second portion 226 of the transmission may be transmitted to the gear 218 to rotate the shaft 212. In addition, the first portion 210 of the transmission may further include a support plate 224 held within the first chamber 132 of the housing 100. The second end 216 of the shaft 212 may be rounded and may be supported within the second chamber 134 of the housing 100 by the support plate 224. For example, the support plate 224 may support the second end 216 of the shaft 212 to resist movement of the shaft 212 along the linear direction L of the housing 100 when the penetrator assembly is inserted into the insertion site.

The manual actuator may be a hand crank that may be manually cranked by an operator to transfer rotational force to the first portion 210 of the transmission. The hand crank may have a first end 228, a second end 232, and an arm 250 extending between the first end 228 and the second end 232. The first end 228 of the hand crank may include a handle 230, which may be grasped by an operator during application of the manual (rotational) force. The handle 230 may be integrally formed with the arm 250. Alternatively, the handle 230 may be provided on a cylindrical bearing 252 of the arm 250 such that the handle 230 may be rotatable relative to the arm 250 to improve the usability of the hand crank.

The second end 232 of the hand crank may include a cylinder 234 having a top 236, a bottom 238, and an outer circumferential surface 244 extending between the top 236 and the bottom 238. The top 236 of the cylinder 234 may be provided outside of the interior of the housing 100. The arm 250 of the hand crank may be attached to the top 236 of the cylinder 234. For example, the arm 250 may be integral with the top 236 of the cylinder 234. Alternatively, the arm 250 may be fixed to the top 236 of the cylinder 234 via a fastener (e.g., screw, bolt, etc.). The arm 250 may extend angularly from the top 236 of the cylinder 234. For example, an angle may be formed between an inner surface 254 of the arm 250 and the outer circumferential surface 244 of the cylinder 234. The angle may be greater than 90 degrees and the arm 250 may be capable of 360-degree rotation without interference from the housing 100.

The bottom 238 of the cylinder 234 may be disposed within the interior of the housing 100. The bottom 238 of the cylinder 234 may include a flange 240. The flange 240 may have an outer diameter that is larger than an inner diameter of the opening 136 of the housing 100. Accordingly, the flange 240 may hold the bottom 238 of the cylinder 234 within the interior of housing 100 by preventing removal of the bottom 238 of the cylinder 234 through the opening 136 of the housing 100. A top of the flange 240 may be a bearing surface that may interface with the housing 100 in a manner that facilitates rotation of the cylinder 234 relative to the housing 100. A bottom of the flange 240 may interface with the first portion 210 of transmission. For example, the bottom of the flange 240 may form a gear 242 that may mesh with the gear 218 of the shaft 212 of the first portion 210 of the transmission such that rotational force may be transmitted between the gear 242 of the bottom of the flange 240 and the gear 218 of the shaft 212 of the first portion 210 of the transmission.

The hand crank may be rotated clockwise and/or counter clockwise. The interface between the bottom of the flange 240 and the first portion 210 of the transmission may be configured such that the hand crank may alternately rotate the first portion 210 of the transmission (and the penetrator assembly 300 attached thereto) in both clockwise and counterclockwise directions. Alternatively, the interface between the bottom of the flange 240 and the first portion 210 of the transmission may be configured such that the hand crank may only rotate the first portion 210 of the transmission (and the penetrator assembly 300 attached thereto) in a single direction (e.g., the clockwise direction). For example, in embodiments not shown a ratchet may be provided between the hand crank and the first portion 210 of the transmission whereby rotational force of the hand crank may only be transmitted to the first portion 210 of the transmission in a single direction to cause the first portion 210 of the transmission to rotate only in, e.g., the clockwise direction.

The inner circumferential surface 248 of the second portion 226 of the transmission that is rotatably supported by the cylindrical bearing 126 of the housing 100, as described above, may be provided within the cylinder 234. For example, the cylinder 234 may be hollow and a second hollow cylinder 246 may be provided within an interior of the hollow cylinder 234. The inner circumferential surface 248 of the second portion 226 of the transmission may be the inner surface of the second hollow cylinder 246.

The outer circumferential surface 244 of the cylinder 234 may extend through, and be rotatably supported by, the opening 136 of the housing 100. An outer diameter of the outer circumferential surface 244 may be smaller than the inner diameter of the opening 136 of the housing 100. The outer diameter of the outer circumferential surface 244 may be small enough to extend through the inner diameter of the opening 136 of the housing 100, yet large enough to restrict wobbling of the second portion 226 of the transmission.

Figure 4:
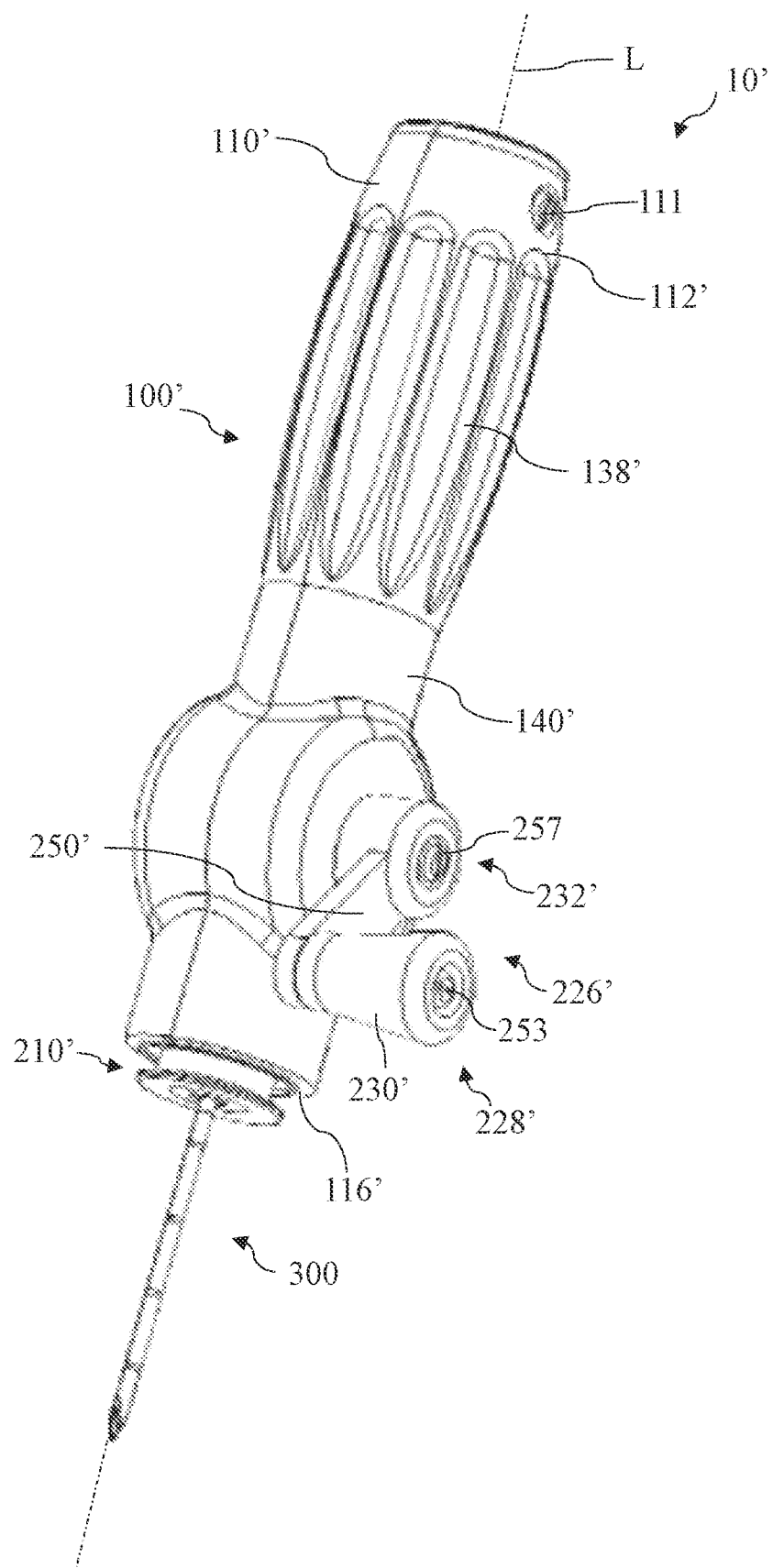
FIG. 4 illustrates a prospective view of another exemplary embodiment of the intraosseous device in accordance with aspects of the invention.
Figure 5:
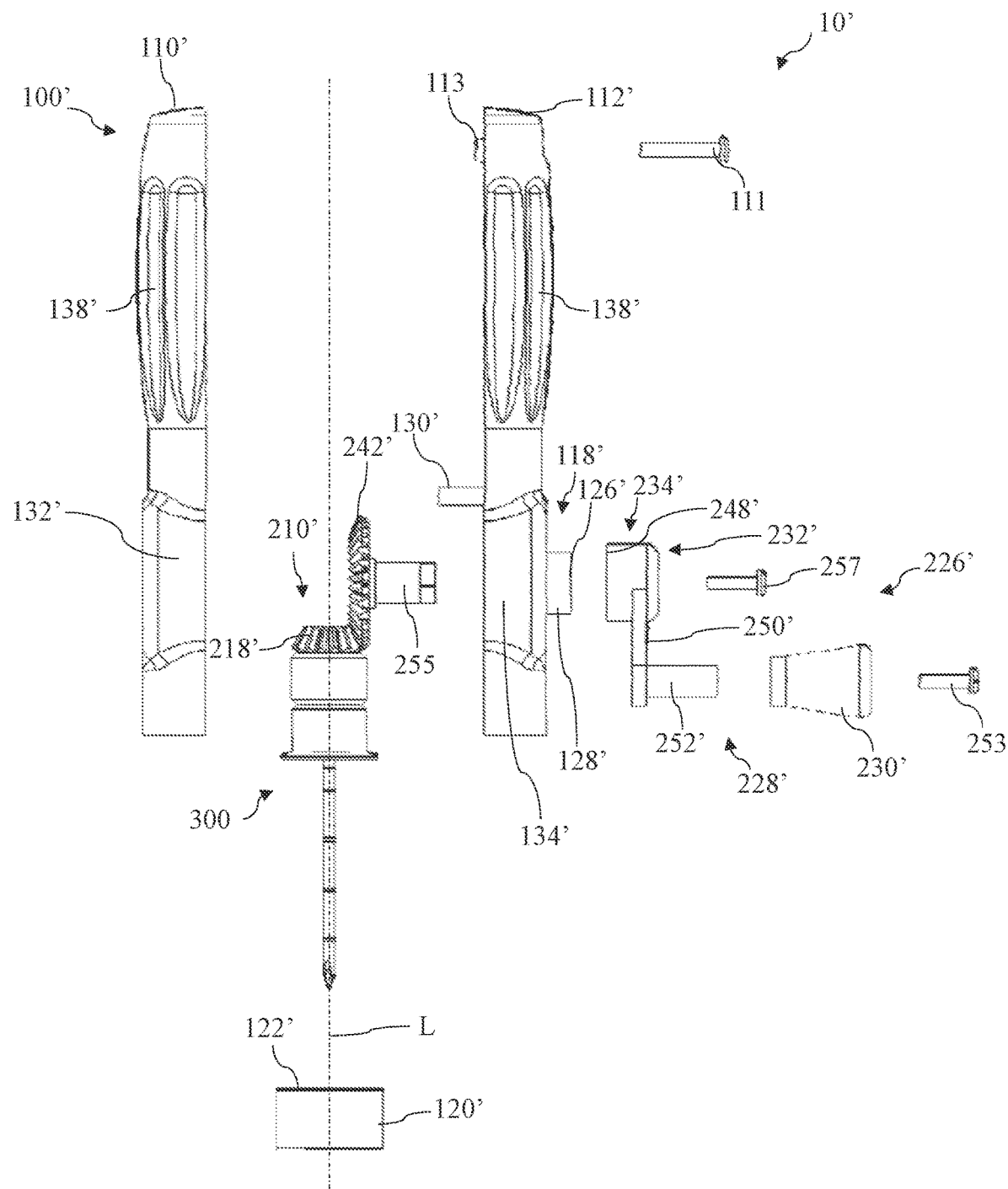
FIG. 5 illustrates a side exploded view of the other exemplary embodiment of the intraosseous device in accordance with aspects of the invention.
Figure 6A:
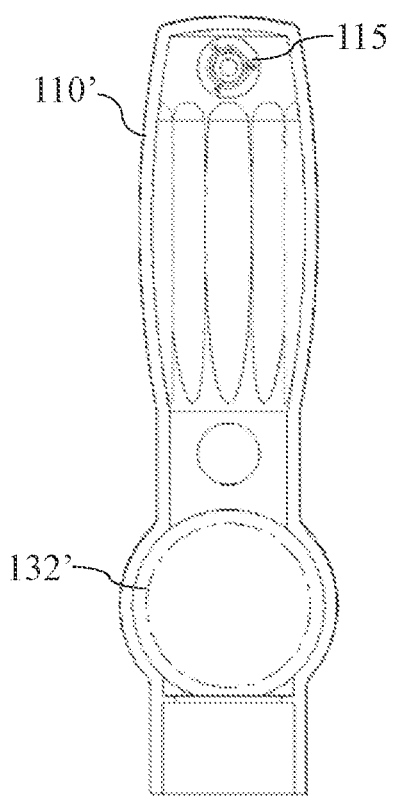
FIGS. 6A and 6B illustrate side views showing the interiors of first and second bodies of the housing of the other exemplary embodiment of the intraosseous device in accordance with aspects of the invention.
Figure 6B:
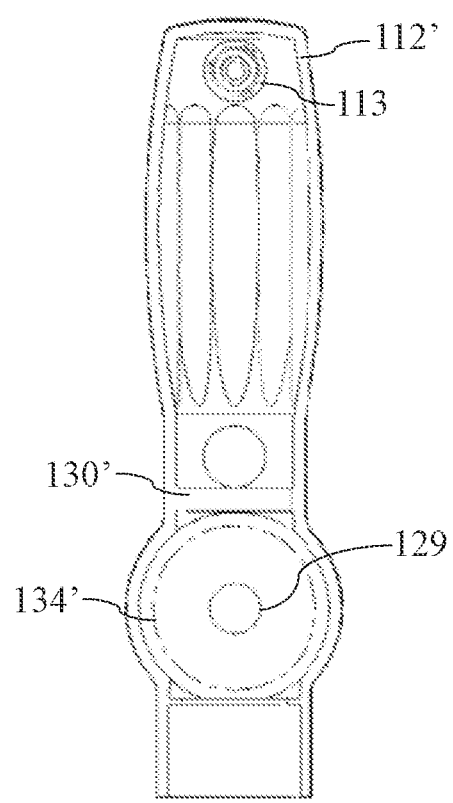
Figure 7A:
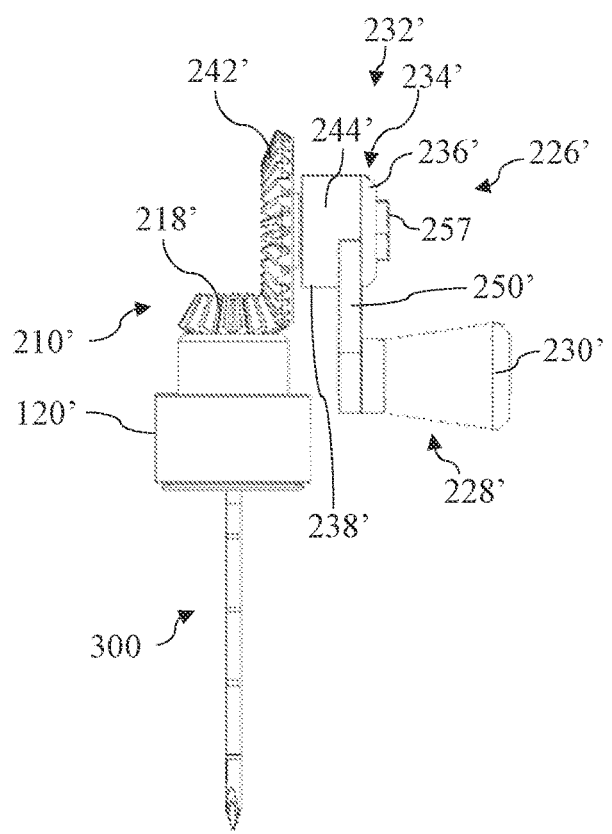
FIGS. 7A and 7B show views of the transmission of the other exemplary embodiment of the intraosseous device in accordance with aspects of the invention.
Figure 7B:
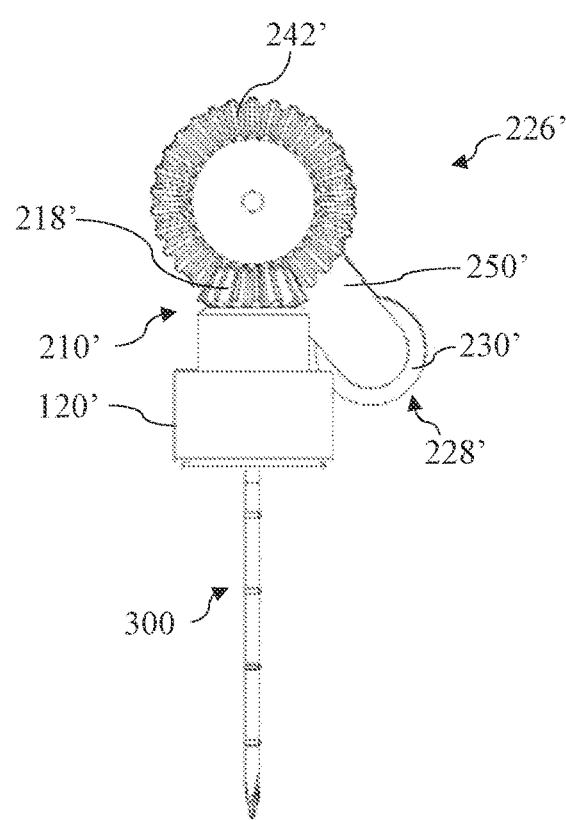

FIGS. 4-7B show another IO device 10' in accordance with aspects of the invention. FIG. 4 illustrates a prospective view of the IO device 10'. FIG. 5 illustrates a side exploded view of the IO device 10'. FIGS. 6A and 6B illustrate side views showing the interiors of first and second bodies of the housing of the IO device 10'. FIGS. 7A and 7B show views of the transmission of the IO device 10'. In these figures, like elements (i.e., with respect to the IO device 10) are referenced with like reference numerals and therefore require no further description. Like reference numerals in the other IO device 10' that include prime (') marks denote corresponding elements of the IO device 10, but may have different function and/or design as described below and/or as is apparent from the drawings.

The IO device 10' may include a driver comprising a housing 100', and a transmission at least partially disposed within the housing 100'. The transmission may include a first portion 210' and a second portion 226'. The second portion 226' may include a manual actuator (e.g., a hand crank) that is at least partially disposed outside of the housing 100'. The IO device 10' may further include the penetrator assembly 300, which may be releasably connected to the first portion 210' of the transmission. The transmission may transmit a force, which is applied manually to the manual actuator, to the penetrator assembly 300 to rotate the penetrator assembly 300 relative to the housing 100' and to drive the penetrator assembly 300 through bone (e.g., the proximal humerus, proximal tibia, distal tibia, etc.) into an intraosseous space (not shown). That is, the transmission may rotate the penetrator assembly 300 relative to the housing 100' to facilitate driving the penetrator assembly 300 through bone into the intraosseous space while an operator presses the IO device 10' through an insertion site.

According to aspects of the invention, the manually driven transmission may obviate the need for a powered transmission, which may lower production costs of the IO device 10' and thereby improve patient access to life-saving IO devices 10'. In addition, the housing 100' of the IO device 10' may be shaped to improve an operator's view of an insertion site on a patient. Further, the IO device 10' may be rotated about a longitudinal direction of the penetrator assembly 300 in accordance with operator preference such that an operator may manually apply the force to the second portion 226' of the transmission using either the operator's left or right hand. In addition, the torque and/or speed of the rotation of the penetrator assembly 300 may be controlled by the operator based upon, e.g., tactile/haptic feedback felt by the operator during application of the force to the second portion 226' of the transmission. Still further, the manually driven IO device 10' may be quieter than powered devices.

The housing 100' may be divided into one or more bodies. For example, the housing 100' may include a first body 110' and a second body 112'. The first body 110' and the second body 112' may be releasably connected. For example, the first body 110' and the second body 112' may be snap fit together. The first body 110' and the second body 112' may additionally or alternatively be connected via one or more fastener 111, such as threads, nuts/bolts, screws, etc. For example, the second body 112' may include a hole 113 through which the fastener 111 may pass. The first body 110' may include a threaded aperture 115 through which the fastener 111 may be threadedly attached to connect the first body 110' and the second body 112'. The first body 110' and the second body 112' may alternatively be fixedly connected. For example, the first body 110' and the second body 112' may be fixed together via an adhesive, weld, etc. The first body 110' and the second body 112' may form an opening 116' when releasably connected together. The housing 100' may include one or more supports 130' that provide structural support to the housing 100'. The supports 130' may be disposed within an interior of the housing 100'.

The housing 100' may include may include bearings 118' that may support the first portion 210' and/or the second portion 226' of the transmission such that the first portion 210' and/or the second portion 226' of the transmission may rotate relative to the housing 100'. The bearings 118' may be formed of the same material that comprises the housing 100'. The bearings 118' may be integrally formed with (i.e., integral with) the housing 100', or may alternatively be distinct components. Distinct bearings (e.g., the tubular bearing 120' described below) may be formed of at least some of the same materials as the housing 100', or may alternatively be formed of at least one different material from the housing 100'.

The bearings 118' may include one or more tubular bearing 120' arranged coaxially along a linear direction L that extends through the housing 100'. The opening 116' of the housing 100' may also be arranged coaxially with the tubular bearing 120' along the linear direction L extending through the housing 100'. The tubular bearing 120' may include an inner circumferential surface 122'. The inner circumferential surface 122' of the tubular bearing 120' may support the first portion 210' of the transmission such that the first portion 210' of the transmission may rotate relative to the housing 100'. For example, the penetrator assembly 300 may extend through the tubular bearing 120' and the inner circumferential surface 122' may support the penetrator assembly 300, which thereby indirectly supports the first portion 210' of the transmission that is fixed to the penetrator assembly 300. The penetrator assembly 300 may be arranged through the tubular bearing 120' of the housing 100' coaxially with the linear direction L extending through the housing 100'. Accordingly, the penetrator assembly 300 may be rotatable relative to the housing 100'. The tubular bearing 120' may be distinct from the first body 110' and the second body 112' and may be held within the opening 116'. An inner diameter of the inner circumferential surface 122' of the tubular bearing 120' may be larger than the outer diameter of the first portion 210' of the transmission and/or than the penetrator assembly 300. The first portion 210' of the transmission and/or the penetrator assembly 300 may extend through the tubular bearing 120'. The inner diameter of the inner circumferential surface 122' of the tubular bearings 120' may be large enough to allow the first portion 210' of the transmission and/or the penetrator assembly 300 to extend through the tubular bearing 120' and to rotate within the tubular bearing 120', yet small enough to restrict wobbling of the first portion 210' of the transmission and/or of the penetrator assembly 300.

The bearings 118' may further include a cylindrical bearing 126' extending perpendicular to the linear direction L of the housing 100'. The cylindrical bearing 126' may support the second portion 226' of the transmission such that the second portion 226' of the transmission may rotate relative to the housing 100'. The cylindrical bearing 126' may be provided on the first body 110' or the second body 112' of the housing 100'. For example, the cylindrical bearing 126' may be provided on the second body 112'.

The cylindrical bearing 126' may have an outer circumferential surface 128' that extends perpendicular to the linear direction L of the housing 100' beyond an exterior of the second body 112'. The outer circumferential surface 128' may rotatably support the second portion 226' of the transmission. For example, the outer circumferential surface 128' may rotatably support an inner circumferential surface 248' of the second portion 226' of the transmission. The cylindrical bearing 126' may be provided within a space bounded by the inner circumferential surface 248' of the second portion 226' of the transmission such that the outer circumferential surface 128' of the cylindrical bearing 126' rotatably supports the second portion 226' of the transmission. A diameter of the outer circumferential surface 128' of the cylindrical bearing 126' may be smaller than a diameter of the inner circumferential surface 248' of the second portion 226' of the transmission. The diameter of the outer circumferential surface 128' of the cylindrical bearing 126' may be small enough to allow the inner circumferential surface 248' of the second portion 226' of the transmission to fit around the outer circumferential surface 128' of the cylindrical bearing 126', yet large enough to restrict wobbling of the second portion 226' of the transmission. The cylindrical bearing 126' may further include an inner circumferential surface 129. The inner circumferential surface 129 may bound an inner space within the cylindrical bearing 126' that may rotatably receive part of the second portion 226' of the transmission (e.g., the shaft 255, described below).

The housing 100' may further include a first chamber 132' and/or a second chamber 134' that may accommodate and/or support the transmission. The first chamber 132' and/or the second chamber 134' may accommodate and/or support at least parts of the first portion 210' and the second portion 226' of the transmission, as described below. The first chamber 132' and/or the second chamber 134' may be provided on the first body 110' or the second body 112' of the housing 100'. For example, the first chamber 132' may be provided on the first body 110' and the second chamber 134' may be provided on the second body 112'. The first chamber 132' and the second chamber 134' may be circularly shaped.

The housing 100' may be formed of any suitable material, or combination of materials, such as, e.g., plastics, metals, composites, rubber, etc. The housing 100' may include ergonomic portions 138' that may improve usability of the IO device 10' by, e.g., improving an operator's grip on the IO device 10'. The ergonomic portions 138' may be textured. The ergonomic portions 138' may be grooves. The ergonomic portions 138' may additionally or alternatively be formed of a material different from materials forming other portions 140' of the housing 100'. For example, the housing 100' may include other portions 140' (e.g., structural regions) that are distinct from the ergonomic portions 138'. The other portions 140' may be made of a first material and the ergonomic portions 138' may be made of a second material. The first material may be different from the second material. For example, the first material may be a rubber material and the second material may be plastic, metal, and/or composite material.

The housing 100' of the IO device 10' may be uniquely shaped to suit operator preferences and/or for particular applications. For example, according to an exemplary embodiment of the invention depicted in, e.g., FIG. 4, the housing 100' of the IO device 10' may be shaped similar to the handle of a screw driver. Alternatively, the IO device 10' may include any of the housings depicted in the embodiments shown in FIGS. 1A-3C and described above.

FIGS. 5, 7A and 7B show details of embodiments of the transmission of the IO device 10'. The transmission of the IO device 10' may be utilized with any of the above-described housing embodiments.

The transmission may be any system comprising, e.g., shafts, gears, torque converters, etc. that may transmit the manually applied force to the penetrator assembly 300 to rotate the penetrator assembly 300 relative to the housing 100' and to drive the penetrator assembly 300 through the bone and into the intraosseous space. For example, the first portion 210' of the transmission may include a gear 218', such as a bevel gear. The gear 218' may interface with the penetrator assembly 300 to connect the transmission to the penetrator assembly 300 to transmit the manual force to the penetrator assembly 300. For example, the gear 218' may be integrally formed with the penetrator assembly 300. The gear 218' may alternatively be a distinct component that may be fixedly or removably attached to the penetrator assembly 300 such that the gear 218' may transmit the manual force to the penetrator assembly 300. For example, the gear 218' may be threadedly attached to the penetrator assembly 300. The gear 218' may be attached to the penetrator assembly 300 via a keyed interface, an adhesive, and/or a magnet. The gear 218' may interface with the second portion 226' of the transmission (e.g., with the gear 242', described below) such that the manually applied force may be transmitted from the second portion 226' of the transmission to rotate the gear 218' about the linear direction L extending through the housing 100'. The gear 218' may be accommodated within the first chamber 132' and/or the second chamber 134' of the housing 100' such that the gear 218' may freely rotate relative to the housing 100'. The gear 218' may mesh with the second portion 226' of the transmission such that rotational force of the second portion 226' of the transmission may be transmitted to the gear 218' to rotate the penetrator assembly 300.

The manual actuator may be a hand crank that may be manually cranked by an operator to transfer rotational force to the first portion 210' of the transmission. The hand crank may have a first end 228', a second end 232', and an arm 250' extending between the first end 228' and the second end 232'. The first end 228' of the hand crank may include a handle 230', which may be grasped by an operator during application of the manual (rotational) force. The handle 230' may be integrally formed with the arm 250'. Alternatively, the handle 230' may be provided on a cylindrical bearing 252' of the arm 250' such that the handle 230' may be rotatable relative to the arm 250' to improve the usability of the hand crank. A fastener 253 may fasten the handle 230' to the cylindrical bearing 252'.

The second end 232' of the hand crank may include a cylinder 234' having a top 236', a bottom 238', and an outer circumferential surface 244' extending between the top 236' and the bottom 238'. The top 236' of the cylinder 234' may be provided outside of the interior of the housing 100'. The arm 250' of the hand crank may be attached to the top 236' of the cylinder 234'. For example, the arm 250' may be integral with the top 236' of the cylinder 234'. Alternatively, the arm 250' may be fixed to the top 236' of the cylinder 234' via a fastener (e.g., screw, bolt, etc.). In embodiments not shown, the arm 250' may extend angularly from the top 236' of the cylinder 234'. For example, an angle may be formed between an inner surface of the arm 250' and the outer circumferential surface 244' of the cylinder 234'. The angle may be greater than 90 degrees and the arm 250' may be capable of 360-degree rotation without interference from the housing 100'.

The second portion 226' of the transmission may include a gear 242', such as a bevel gear, that may mesh with the gear 218' of the first portion 210' of the transmission such that rotational force may be transmitted between the gear 242' and the gear 218'. The gear 242' may be coupled to the hand crank such that an operator may transmit rotational force from the hand crank to the gear 242'. For example, the gear may include a shaft 255 that may be received within the inner space bound by the inner circumferential surface 129 of the cylindrical bearing 126'. The shaft 255 may be keyed and may fit within a complementary keyed region within the hollow interior of the cylinder 234'. A fastener 257 may fasten to the shaft 255 and the cylinder 234'.

The hand crank may be rotated clockwise and/or counter clockwise. The interface between the first portion 210' and the second portion 226' of the transmission may be configured such that the hand crank may alternately rotate the first portion 210' of the transmission (and the penetrator assembly 300 attached thereto) in both clockwise and counter-clockwise directions. Alternatively, the first portion 210' and the second portion 226' of the transmission may be configured such that the hand crank may only rotate the first portion 210' of the transmission (and the penetrator assembly 300 attached thereto) in a single direction (e.g., the clockwise direction). For example, in embodiments not shown a ratchet may be provided between the hand crank and the first portion 210' of the transmission whereby rotational force of the hand crank may only be transmitted to the first portion 210' of the transmission in a single direction to cause the first portion 210' of the transmission to rotate only in, e.g., the clockwise direction.

The inner circumferential surface 248' of the second portion 226' of the transmission that is rotatably supported by the cylindrical bearing 126' of the housing 100', as described above, may be provided within the cylinder 234'. In addition, the shaft 255 may extend through and be rotatably supported by the inner space of the cylindrical bearing 126'. A diameter of the inner circumferential surface 129 of the cylindrical bearing 126' may be larger than a diameter of the shaft 255 of the second portion 226' of the transmission. The diameter of the inner circumferential surface 129 of the cylindrical bearing 126' may be large enough to allow the shaft 255 of the second portion 226' of the transmission to fit within the inner space bounded by the inner circumferential surface 129, yet small enough to restrict wobbling of the shaft 255 of the second portion 226' of the transmission.

Figure 8C:
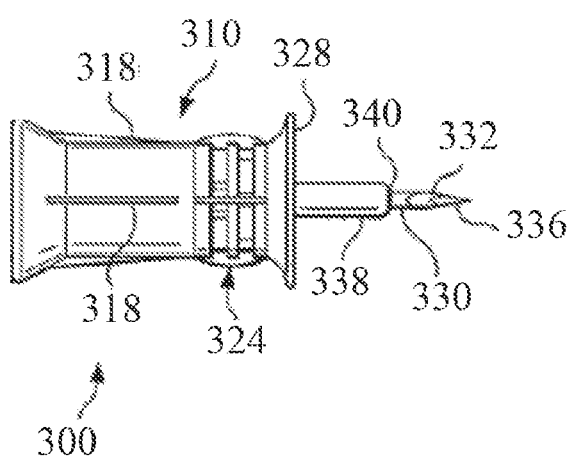
Figure 8C:
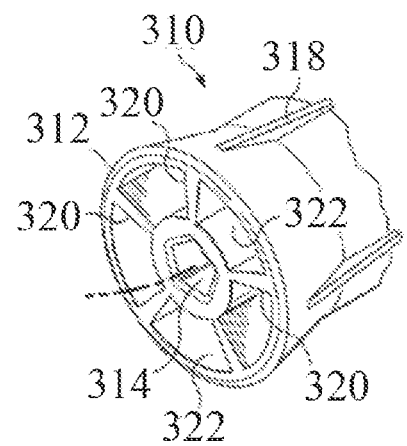
Figure 8C:
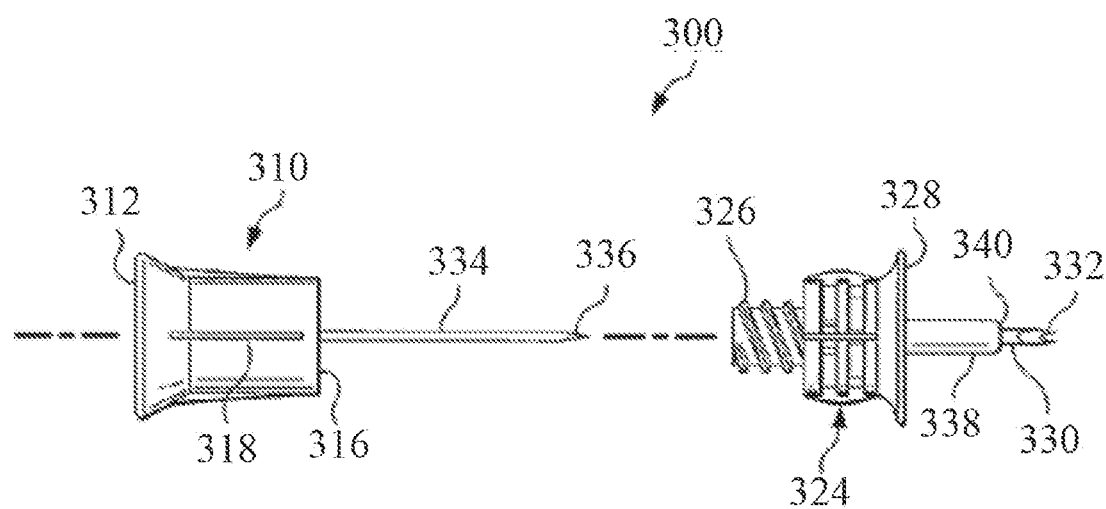

FIGS. 8A-8C show an exemplary embodiment of the penetrator assembly 300 according to aspects of the invention. The penetrator assembly 300 may be included with either or both of the above-described IO devices 10, 10'. The penetrator assembly 300 may include a connector 310, an associated hub 324, an outer penetrator 330, and an inner penetrator 334. The outer penetrator 330 may include, e.g., a cannula, hollow tube, or hollow drill bit. The inner penetrator 334 may include, e.g., a stylet or trocar. Various types of stylets and/or trocars may be disposed within the outer penetrator 330.

The connector 310 may connect the penetrator assembly 300 to the transmission. For some applications, connector 310 may be described as having a generally cylindrical configuration defined in part by a first end 312 and a second end 316. Exterior portions of the connector 310 may include an enlarged tapered portion adjacent to first end 312. A plurality of longitudinal ridges 318 may be formed on the exterior of connector 310 to allow an operator to grasp associated penetrator assembly 300 during attachment with the shaft 212. Longitudinal ridges 318 also allow connector 310 to be grasped for disengagement from hub 324 when outer penetrator 330 has been inserted into bone and associated bone marrow.

The first end 312 of the connector 310 may include an opening 314 sized to receive portions of the shaft 212 therein. A magnet (not shown) may be disposed within the opening 314 to attract the shaft 212 to the opening 314. A plurality of webs 320 may extend radially outward from opening 314. The webs 320 cooperate with each other to form a plurality of openings 322 adjacent to first end 312. Opening 314 and openings 322 cooperate with each other to form portions of a connector receptacle.

Second end 316 of connector 310 may include an opening (not expressly shown) sized to receive first end 326 of hub 324, therein. Threads may be formed in the opening adjacent to second end 316 of connector 310. Such threads may be used to releasably attach connector 310 with threads disposed adjacent to a first end 326 of the hub 324.

The first end 326 of hub 324 may have a generally cylindrical pin type configuration compatible with releasable engagement with second end 316 of connector 310. For some applications first end 326 and threads may provide a portion of a Luer lock connection. Various types of Luer lock connections may be formed on the first end 326 of hub 324 for use in to releasably engage tubing and/or other medical devices (not expressly shown) with hub 324 after IO device 10 had been inserted into bone marrow at a target area and inner penetrator 334 removed from outer penetrator 330.

For some applications outer penetrator 330 may be described as a generally elongated tube sized to receive inner penetrator 334 therein. Portions of inner penetrator 334 may be slidably disposed within a longitudinal passageway (not expressly shown) extending through outer penetrator 330. The outside diameter of inner penetrator 334 and the inside diameter of the longitudinal passageway may be selected such that inner penetrator 334 may be slidably disposed within outer penetrator 330.

A tip 332 of the outer penetrator 330 and/or a tip 336 of inner penetrator 334 may be operable to penetrate bone and associated bone marrow. The configuration of tips 332 and/or 336 may be selected to penetrate a bone or other body cavities with minimal trauma. Tip 336 of inner penetrator 334 may be trapezoid shaped and may include one or more cutting surfaces. In one embodiment outer penetrator 330 and inner penetrator 334 may be ground together as one unit during an associated manufacturing process. Providing a matching fit allows respective tips 332 and 336 to act as a single drill, which facilitates insertion and minimizes damage as portions of penetrator assembly 300 are inserted into a bone and associated bone marrow.

Inner penetrator 334 may also include a longitudinal groove (not expressly shown) that runs along the side of inner penetrator 334 to allow bone chips and/or tissues to exit an insertion site as penetrator assembly 300 is drilled deeper into an associated bone. Outer penetrator 330 and inner penetrator 334 may be formed from stainless steel, titanium or other materials of suitable strength and durability to penetrate bone.

For some applications a depth control limiter incorporating teachings of the present disclosure, such as collar 338, may be disposed on and engaged with exterior portions of outer penetrator 330. The collar 338 may sometimes be referred to as a "depth control limiter." Other examples of depth control limiters which may be used, or adapted for use, with the present invention may be found, e.g., in U.S. Pat. No. 8,998,848, the contents of which is hereby expressly incorporated by reference herein in its entirety.

For some embodiments collar 338 may have a generally elongated, hollow configuration compatible with engaging the outside diameter of outer penetrator 330. A first end (not expressly shown) of collar 338 may be installed over exterior portions of outer penetrator 330 and disposed within adjacent portions of hub 324. A second end 340 of collar 338 may extend a selected distance from a second end 328 of hub 324. Various techniques such as, but not limited to, press fitting may be used to install collar 338 on exterior portions of outer penetrator 330.

The resulting spacing between second end 328 of hub 324 and second end 340 of collar 338 may limit depth of penetration of outer penetrator 330 into bone and associated bone marrow. Second end 328 of hub 324 and second end 340 of collar 338 may cooperate with each other to provide a depth control limiter for associated IO device 10 or penetrator assembly 300. Collar 338 may be formed from various materials including stainless steel, titanium or other materials used to form outer penetrator 330.

Collar 338 will generally be securely engaged with the exterior of outer penetrator 330. As a result, outer penetrator 330 and collar 338 will generally rotate with each other when force is applied via the transmission. For other applications portions of the IO device 10 and an associated depth control limiter may be operable to rotate relative to each other during insertion of the IO device 10 into bone marrow adjacent to a selected insertion site.

Hub 324 may be used to stabilize the penetrator assembly 300 during insertion of an associated penetrator into a patient's skin, soft tissue and adjacent bone at a selected insertion site. Hub 324 may also be used as a handle to manipulate outer penetrator 330 or remove outer penetrator 330 from a target area. First end 326 of hub 324 may be operable for releasable engagement or attachment with associated connector 310.

Passageway (not shown) may extend from first end 326 through second end 328. The inside diameter of the passageway may be selected to securely engage the outside diameter of inner penetrator 334. The dimensions and configuration of passageway may be selected to maintain associated outer penetrator 330 engaged with hub 324.

Second end 328 of hub 324 may have a size and configuration compatible with an insertion site for an associated penetrator assembly 300.

Guide mechanisms and/or stabilizers (not shown) may be provided when the IO device 10 is inserted into a patient, to guide and/or stabilize the IO device 10 during insertion. Examples of such guide mechanisms and/or stabilizers that may be used, or adapter for use, with the present invention may be found in U.S. Pat. Nos. 9,839,740 and 8,974,410, which are each hereby expressly incorporated by references herein in their entirety.

Figure 9:
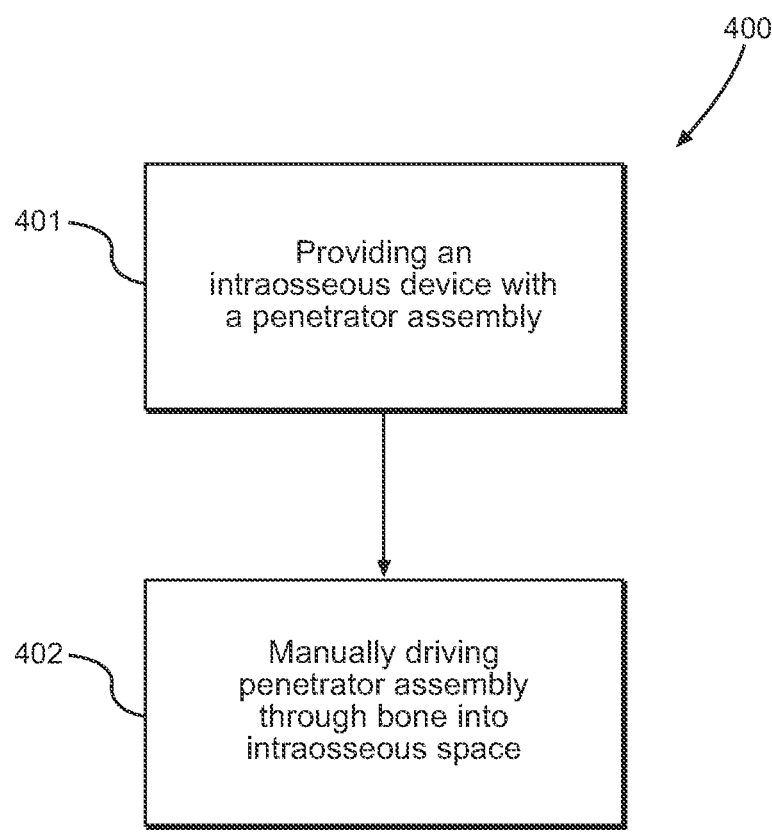
FIG. 9 illustrates an exemplary process for accessing an intraosseous space of a patient in accordance with aspects of the invention.

FIG. 9 illustrates an exemplary process 400 for accessing an intraosseous space of a patient in accordance with aspects of the invention. At a first step 401, the process 400 may include providing an IO device 10 (or the other IO device 10'). The IO device 1040 device 10' may include aspects of any of the above-described embodiments. For example, the IO device 10 may include the housing 100 and the transmission at least partially disposed within the housing 100. The transmission may include the first portion 210 and the second portion 226. The IO device 10 may further include the penetrator assembly 300 releasably connected to the first portion 210 of the transmission.

At a second step 402, the process 400 may include driving the penetrator assembly 300 through bone into the intraosseous space of the patient. Driving the penetrator assembly 300 through the bone and into the intraosseous space may include manually applying a first force to the housing 100. The first force may direct the IO device 10 towards an insertion site on the patient. The insertion site may be disposed on a patient at, for example, the proximal humerus, the proximal tibia, the distal tibia, etc. An operator may grasp the housing 100 with one hand and press the housing 100 towards the insertion site. Driving the penetrator assembly 300 through the bone and into the intraosseous space may further include manually applying a second force, concurrently with manually applying the first force, to the second portion 226 of the transmission and transmitting the second force to the penetrator assembly 300 to rotate the penetrator assembly 300 relative to the housing 100. For example, the operator may apply the manual force to the second portion 226 of the transmission (e.g., to the handle 230 of the hand crank) to rotate the hand crank and thereby rotate the penetrator assembly 300, as described above. Upon completion of driving the penetrator assembly 300 though the bone and into the intraosseous space, the penetrator assembly 300 may be removed from the first portion 210 of the transmission permitting access to the intraosseous space to, e.g., inject fluids into the patient in a known manner.

The many features and advantages of the IO devices and methods described herein are apparent from the detailed specification, and thus, the claims cover all such features and advantages within the scope of this application. Further, numerous modifications and variations are possible. As such, it is not desired to limit the IO devices to the exact construction and operation described and illustrated and, accordingly, all suitable modifications and equivalents may fall within the scope of the claims.

What is claimed is:

1. An intraosseous device comprising:
a housing;
a transmission at least partially disposed within the housing, the transmission including a first portion and a second portion, the second portion including a manual actuator that is at least partially disposed outside of the housing; and
a penetrator assembly releasably connected to the first portion of the transmission;
wherein the transmission is configured to transmit a force, which is applied manually to the manual actuator, to the penetrator assembly to rotate the penetrator assembly relative to the housing and to drive the penetrator assembly through a bone into an intraosseous space;
wherein the first portion of the transmission includes a shaft having a first end that is configured to connect to the penetrator assembly; and
wherein a magnet is embedded in the first end of the shaft.

2. The intraosseous device according to claim 1, wherein the manual actuator is a hand crank that is configured to be manually cranked by an operator to transfer rotational force to the first portion of the transmission.

3. The intraosseous device according to claim 2, wherein the hand crank includes a first end, a second end, and an arm extending between the first end and the second end.

4. The intraosseous device according to claim 3, wherein the first end of the hand crank includes a handle.

5. The intraosseous device according to claim 3, wherein the second end of the hand crank includes a cylinder having a top, a bottom, and an outer circumferential surface extending between the top and the bottom.

6. The intraosseous device according to claim 5, wherein the second portion of the transmission includes a gear that is configured to mesh with a gear of the first portion of the transmission to transmit the force between the hand crank and the first portion of the transmission.

7. The intraosseous device according to claim 1, wherein the first end of the shaft is keyed.

8. The intraosseous device according to claim 1, wherein the first portion of the transmission or the penetrator assembly is provided through at least one tubular bearing of the housing so as to be rotatable relative to the housing.

9. The intraosseous device according to claim 1, wherein the first portion of the transmission is configured to interface with the second portion of the transmission such that the second portion of the transmission is configured to rotate a second end of the shaft.

10. The intraosseous device according to claim 9, wherein the second end of the shaft includes a gear.

11. The intraosseous device according to claim 1, wherein the housing is divided into a first body and a second body that are snap fit together.

12. The intraosseous device according to claim 11, wherein the housing comprises bearings that support the first portion and the second portion of the transmission such that the first portion and the second portion of the transmission are configured to rotate relative to the housing.

13. The intraosseous device according to claim 12, wherein the bearings are integral with the housing.

14. The intraosseous device according to claim 12, wherein the bearings comprise at least one tubular bearing.

15. The intraosseous device according to claim 14, wherein
the at least one tubular bearing is one of a plurality of tubular bearings,
the plurality of tubular bearings each include an inner circumferential surface,
the plurality of tubular bearings are each arranged coaxially along a linear direction extending through the housing, and
the inner circumferential surface of each of the plurality of tubular bearings support the first portion of the transmission such that the first portion of the transmission is configured to rotate relative to the housing.

16. The intraosseous device according to claim 15, wherein an inner diameter of the inner circumferential surface of each of the plurality of tubular bearings is larger than an outer diameter of the first portion of the transmission such that the first portion of the transmission is configured to extend through the plurality of tubular bearings.

17. An intraosseous device comprising:
a housing;
a transmission at least partially disposed within the housing, the transmission including a first portion and a second portion, the second portion including a manual actuator that is at least partially disposed outside of the housing; and
a penetrator assembly releasably connected to the first portion of the transmission;
wherein the transmission is configured to transmit a force, which is applied manually to the manual actuator, to the penetrator assembly to rotate the penetrator assembly relative to the housing and to drive the penetrator assembly through a bone into an intraosseous space;

wherein the first portion of the transmission includes a shaft having a first end that is configured to connect to the penetrator assembly; and wherein the first portion of the transmission further includes a support plate held within a chamber of the housing, and the support plate supports a second end of the shaft.

18. The intraosseous device according to claim 17, wherein the manual actuator is a hand crank that is configured to be manually cranked by an operator to transfer rotational force to the first portion of the transmission.

19. The intraosseous device according to claim 17, wherein the shaft is magnetic.

20. The intraosseous device according to claim 17, wherein the first end of the shaft is keyed.

* * * * *